United States Patent
Koide et al.

(10) Patent No.: US 7,253,581 B2
(45) Date of Patent: Aug. 7, 2007

(54) DATA STORAGE DEVICE, MOTOR CONTROL DEVICE, AND MOTOR CONTROL METHOD

(75) Inventors: Nobuhisa Koide, Kanagawa (JP); Yukiko Hayashi, Kanagawa (JP); Shougo Shimada, Kanagawa (JP); Gaku Ikedo, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/031,746

(22) Filed: Jan. 6, 2005

(65) Prior Publication Data
US 2005/0151499 A1 Jul. 14, 2005

(30) Foreign Application Priority Data
Jan. 14, 2004 (JP) ............................. 2004-007177

(51) Int. Cl.
*G05F 1/10* (2006.01)
(52) U.S. Cl. ............... 318/650; 318/138; 318/254; 318/439; 318/432; 318/434; 318/453; 318/474; 360/73.03; 360/75; 360/78.06
(58) Field of Classification Search ................ 318/138, 318/254, 439, 700, 432, 434, 453, 474; 360/73.03, 360/75, 78.06
See application file for complete search history.

(56) References Cited

U.S. PATENT DOCUMENTS

| | | | | |
|---|---|---|---|---|
| 4,983,894 A | * | 1/1991 | Oku et al. .................. | 318/138 |
| 5,117,165 A | * | 5/1992 | Cassat et al. ............... | 318/254 |
| 5,327,053 A | * | 7/1994 | Mann et al. ................. | 318/254 |
| 5,530,326 A | * | 6/1996 | Galvin et al. ............... | 318/254 |
| 5,982,133 A | * | 11/1999 | Murakami et al. .......... | 318/650 |
| 6,218,795 B1 | * | 4/2001 | Syukuri ...................... | 318/254 |
| 6,340,873 B2 | * | 1/2002 | Seki et al. ................... | 318/254 |
| 6,380,707 B1 | * | 4/2002 | Rosholm et al. ............ | 318/439 |
| 6,448,725 B1 | * | 9/2002 | Cho et al. .................... | 318/254 |
| 6,512,342 B2 | * | 1/2003 | Kawagoshi .................. | 318/254 |
| 6,642,681 B2 | * | 11/2003 | Kawabata et al. .......... | 318/431 |
| 6,724,166 B2 | * | 4/2004 | Narumi et al. .............. | 318/439 |

FOREIGN PATENT DOCUMENTS

| | | |
|---|---|---|
| JP | 2001-103785 | 4/2001 |
| JP | 2002-305892 | 10/2002 |

* cited by examiner

*Primary Examiner*—Lincoln Donovan
*Assistant Examiner*—Tyrone Smith
(74) *Attorney, Agent, or Firm*—Townsend and Townsend and Crew LLP; Patrick Duncan

(57) ABSTRACT

Embodiments of the invention provide a way to accurately detect the position of a spindle motor. In a spindle motor startup process according to one embodiment, a parameter setup section acquires from a parameter table a sense time value corresponding to an input voltage that is acquired from an ADC. The parameter setup section sets the sense time value in a register. A position determination section, which is within an SPM driver, performs an induced voltage detection process for rotor position detection purposes during the time corresponding to the sense time value that is set in the register. Even when the input voltage is decreased, rotor position detection can be properly achieved by changing the sense time value in accordance with a change in the input voltage.

21 Claims, 8 Drawing Sheets

| Input voltage | Sense time |
|---|---|
| Low voltage | 9 |
| Middle voltage | 8 |
| High voltage | 7 |

310

(b)

| Input voltage / Sense time | 1 1. 0 4 | 1 1. 4 0 | 1 2. 0 0 | 1 2. 6 | 1 3. 2 0 |
|---|---|---|---|---|---|
| 1 3 | | | 2. 7 1 | | |
| 1 2 | 2. 4 6 | 2. 5 5 | 2. 6 0 | 2. 8 7 | 3. 0 8 |
| 1 1 | 2. 2 8 | 2. 3 9 | 2. 5 2 | 2. 7 6 | 2. 9 2 |
| 1 0 | 2. 0 7 | 2. 1 9 | 2. 3 7 | 2. 5 1 | 2. 7 1 |
| 9 | <u>1. 8 7</u> | <u>1. 9 8</u> | 2. 1 7 | 2. 3 7 | 2. 5 8 |
| 8 | 1. 7 1 | 1. 7 8 | <u>1. 9 1</u> | 2. 0 7 | 2. 2 3 |
| 7 | 1. 5 5 | 1. 6 3 | 1. 6 9 | <u>1. 8 7</u> | <u>1. 9 8</u> |
| 6 | 1. 4 2 | 1. 4 6 | 1. 5 7 | 1. 6 0 | 1. 6 9 |
| 5 | | | 1. 6 3 | | |
| 4 | | | 1. 3 4 | | |

|  | I | II | III | IV | V | Overall |
|---|---|---|---|---|---|---|
| Average | 3.99 | 4.36 | 3.85 | 6.29 | 5.86 | 4.87 |
| Maximum | 4.67 | 6.70 | 4.55 | 8.02 | 8.18 | 8.18 |
| Minimum | 3.84 | 4.00 | 3.78 | 4.83 | 5.05 | 3.78 |
| Standard deviation | 0.22 | 0.47 | 0.14 | 0.78 | 0.47 | |

(b)

|  | I | II | III | IV | V | Overall |
|---|---|---|---|---|---|---|
| Average | 3.89 | 4.10 | 3.82 | 5.43 | 4.75 | 4.40 |
| Maximum | 3.96 | 4.78 | 3.90 | 9.56 | 9.23 | 9.56 |
| Minimum | 3.84 | 4.00 | 3.73 | 4.88 | 4.12 | 3.73 |
| Standard deviation | 0.03 | 0.10 | 0.03 | 0.31 | 0.29 | |

I. Middle temperature and middle voltage
II. High temperature and low voltage
III. High temperature and high voltage
IV. Low temperature and low voltage
V. Low temperature and high voltage

| Retry count | I | II | III | IV | V | Overall |
|---|---|---|---|---|---|---|
| 0 | 86.0 | 67.0 | 95.0 | 73.0 | 100.0 | 84.2 |
| 1 | 14.0 | 27.0 | 5.0 | 26.0 | 0.0 | 14.4 |
| 2 | 0.0 | 5.0 | 0.0 | 0.0 | 0.0 | 1.0 |
| 3 | 0.0 | 1.0 | 0.0 | 0.0 | 0.0 | 0.2 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.0 | 0.0 | 0.0 | 0.0 | 0.0 | 0.0 |

(b)

| Retry count | I | II | III | IV | V | Overall |
|---|---|---|---|---|---|---|
| 0 | 100.0 | 97.8 | 100.0 | 100.0 | 100.0 | 99.6 |
| 1 | 0.0 | 2.2 | 0.0 | 0.0 | 0.0 | 0.4 |
| 2 | 0.0 | 0.0 | 0.0 | 0.0 | 0.0 | 0.0 |
| 3 | 0.0 | 0.0 | 0.0 | 0.0 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.0 | 0.0 | 0.0 | 0.0 | 0.0 | 0.0 |

I. Middle temperature and middle voltage
II. High temperature and low voltage
III. High temperature and high voltage
IV. Low temperature and low voltage
V. Low temperature and high voltage

DATA STORAGE DEVICE, MOTOR CONTROL DEVICE, AND MOTOR CONTROL METHOD

CROSS-REFERENCES TO RELATED APPLICATIONS

This application claims priority from Japanese Patent Application No. JP 2004-7177, filed Jan. 14, 2004, the entire disclosure of which is incorporated herein by reference.

BACKGROUND OF THE INVENTION

The present invention relates to a data storage device and motor control method, and more particularly to a data storage device and motor control method for detecting the rotor position at motor startup.

It is known that information recording/playback devices use various types of media such as optical disks and magnetic tapes. Among others, hard disk drives are widely used as a computer's storage device and recognized as being essential to the present-day computer systems. Owing to their excellent characteristics, the hard disk drives have found increasingly wide applications including computers, motion picture storage/playback devices, car navigation systems, and removable memories for use, for instance, in digital cameras.

A hard disk drive comprises a magnetic disk for storing data, a spindle motor for rotating the magnetic disk, a magnetic head for reading data stored on the magnetic disk and/or writing data onto the magnetic disk, and an actuator to which the magnetic head is fastened. The actuator is driven by a voice coil motor (VCM). The actuator swings on a pivot to move the magnetic head. To read/write data, the actuator moves the magnetic head to a data area on a rotating surface of the magnetic disk. The magnetic head has a recording/playback thin-film device and a slider. The pressure produced by the viscosity of the air between the slider's ABS (Air Bearing Surface), which faces the magnetic disk, and the rotating magnetic disk properly balances with the pressure applied toward the magnetic disk by the actuator. As a result, the magnetic head floats above the magnetic disk with a fixed air gap.

The spindle motor is subject to drive control by a spindle motor driver (SPM driver). The SPM driver provides control over spindle motor startup and rotation. When the spindle motor at a standstill starts rotating, the SPM driver performs a predefined startup process. Since the startup process inhibits the spindle motor from rotating in a reverse direction or in some other improper manner, the SPM driver detects the rotor position of the spindle motor. When the rotor position is accurately detected, it is possible to avoid a startup failure of the spindle motor. However, the rotor position is not detected accurately at all times.

Upon rotor position detection, the SPM driver supplies a drive current to the spindle motor's stator coil in accordance with the detection result. If the SPM driver detects the spindle motor's rotation failure, it stops supplying the drive current and performs a retry process. In the retry process, the startup process is repeated beginning with the first rotor position detection sequence. The time interval between the instant at which the startup process begins and the instant at which the spindle motor begins its steady-state rotation is referred to as the spin-up time. When the retry process is performed, the spin-up time is extended. Since the retry process is performed in the event of a startup process failure, the spin-up time varies with the retry count. It is therefore desired that the rotor position be accurately detected to minimize the retry count.

The technology for accurately detecting the rotor position to avoid a startup failure is disclosed, for instance, by Japanese Patent JP-A No. 305892/2002. According to this reference, in a motor drive device that achieves rotor position detection by detecting the back electromotive force of rotor rotation, the reference potential to be compared against the back electromotive force for position detection purposes is varied with the input voltage so as to properly output a position-indicating signal from the back electromotive force. The back electromotive force has a relatively great peak value when the input voltage is high and a relatively small peak value when the input voltage is low. If the comparator's reference voltage is maintained at a constant potential difference from the input voltage without regard to the magnitude of the input voltage when the electromotive force peak value is rendered great or small due to a change in the input voltage, the rotor's rotary position cannot be properly detected even if the back electromotive force generated on the stator coil is entered into the comparator. The technology disclosed by this reference makes it possible to properly detect the rotor's rotary position by setting the reference voltage in such a manner that the potential difference from the input voltage varies with the magnitude of the input voltage.

BRIEF SUMMARY OF THE INVENTION

The above conventional technology improves the rotor position detection accuracy by varying the reference voltage that is to be compared against the detected back electromotive force. Therefore, if the back electromotive force (voltage value derived from the back electromotive force) cannot be accurately detected when the back electromotive force is small, the above conventional technology does not properly cope with the situation at all times. Another known technology for rotor position detection causes a position detection current flow to the stator coil without rotating the rotor, and detects a voltage induced on the stator coil. However, when this rotor position detection method is used, there may be cases where the rotor position is not accurately detected due to input voltage variations. Failure to detect the rotor position frequently occurs particularly in a hard disk drive operating on a low input voltage or a hard disk drive having a low spindle motor torque constant. Meanwhile, one important technical task is to reduce the input current with a view toward decreasing the amount of power consumption or the load on the power supply.

One feature of the present invention is to improve the accuracy of detecting the rotor position of a motor.

The data storage device according to one aspect of the present invention comprises a storage disk for storing data, a motor for rotating the storage disk, and a motor control section for controlling the motor. The motor control section includes a parameter setup section for setting parameter values in accordance with a supply voltage value for detecting the position of the motor, an induced voltage detection section for detecting a voltage induced on the coil of the motor in accordance with a parameter value set by the parameter setup section, and a rotor position determination section for determining the rotor position of the motor in accordance with an induced voltage detected by the induced voltage detection section. Since the parameter value is set in accordance with the supply voltage value, induced voltage detection can be properly achieved in accordance with the supply voltage value with a view toward enhancing the accuracy of rotor position determination.

In some embodiments, the parameter setup section sets a detection time parameter for determining the detection time for the induced voltage in accordance with the supply voltage value, and the induced voltage detection section detects the induced voltage during the detection time corresponding to the detection time parameter set by the parameter setup section. It is preferred that the parameter setup section set a detection time parameter that increases with a decrease in the supply voltage. The induced voltage can be detected more properly when the detection time is varied according to the supply voltage value. Further, the parameter setup section can determine the temperature category to which the supply voltage belongs, and set a detection time parameter corresponding to the determined temperature category.

The motor may include coils in multiple phases. The induced voltage detection section can supply a current for rotor position determination to a coil in a specified phase and detect the induced voltage of a coil to which the current is not supplied. Further, the induced voltage detection section supplies a current on a level on which rotor rotation does not occur to the motor as a current for determining the rotor position. The present invention is useful particularly for this type of motor.

In specific embodiments, the parameter setup section sets a current supply time parameter for determining the supply time for the current in accordance with the supply voltage value, and the induced voltage detection section supplies the current to a coil in the specified phase during the supply time corresponding to the current supply time parameter set by the parameter setup section. The induced voltage can be detected more properly when the current supply time is varied according to the supply voltage value.

It is preferred that the motor include coils in multiple phases, and that the induced voltage detection section supply a current for rotor position determination to a coil in a specified phase and detect the induced voltage of a coil to which the current is not supplied. It is also preferred that the parameter setup section set a detection time parameter for determining the detection time for the induced voltage in accordance with the supply voltage value, and that the induced voltage detection section detect the induced voltage during the detection time corresponding to the detection time parameter set by the parameter setup section. The induced voltage can be detected more properly when the detection time is varied according to the supply voltage value. Further, the induced voltage detection section can supply a current on a level on which rotor rotation does not occur to the motor as a current for determining the rotor position. Furthermore, the induced voltage detection section can supply a current for determining the rotor position to the motor while it is stopped. It is therefore possible to increase the accuracy of rotor position detection in a motor startup process.

In some embodiments, the parameter setup section sets the value of the detection time parameter so that the value of a supply current for a process performed by the induced voltage detection section is not greater than predefined. The load on the power supply can then be reduced. Alternatively, the motor control section may include a parameter table for storing the relationship between supply voltage values and parameter values, and the parameter setup section may reference the parameter table to set a particular one of the parameter values in accordance with a particular one of the supply voltage values.

The motor control method according to another aspect of the present invention comprises detecting a supply voltage, the step of setting a parameter value in accordance with the value of the detected supply voltage; detecting, in accordance with the parameter value that is set, a voltage induced on the coil of a motor because of a current supplied to the motor; and determining the rotor position of the motor in accordance with the detected induced voltage. When a parameter value is set according to the supply voltage value, induced voltage detection can be properly achieved in accordance with the supply voltage value. This results in an increase in the accuracy of rotor position determination.

The motor may include coils in multiple phases. The induced voltage detection step can supply a current for rotor position determination to a coil in a specified phase and detect the induced voltage of a coil to which the current is not supplied. Further, it is preferred that the parameter value setup step set a detection time parameter for determining the detection time for the induced voltage in accordance with the supply voltage value, and that the induced voltage detection step detect the induced voltage during the detection time corresponding to the detection time parameter that is set.

In some embodiments, the parameter value setup step sets a current supply time parameter for determining the supply time for the current in accordance with the supply voltage value, and the induced voltage detection step supplies the current to a coil in the specified phase during the supply time corresponding to the current supply time parameter set by the parameter setup section.

The motor control device for a motor having coils in multiple phases in accordance with another aspect of the present invention comprises a parameter setup section for setting a parameter value in accordance with a supply voltage value, an induced voltage detection section for supplying a current to a specified coil in accordance with the parameter value set by the parameter setup section and detecting a voltage induced on a coil to which no current is supplied, and a rotor position determination section for determining the rotor position of the motor in accordance with the induced voltage detected by the induced voltage detection section. When a parameter value is set according to the supply voltage value, induced voltage detection can be properly achieved in accordance with the supply voltage value. This results in an increase in the accuracy of rotor position determination.

The motor may include a coil in a first phase, a coil in a second phase, and a coil in a third phase. The induced voltage detection section can detect, in accordance with the same parameter value set by the parameter setup section, the induced voltage of the coil in the third phase when a current is supplied between the first phase and the second phase, the induced voltage of the coil in the first phase when a current is supplied between the second phase and the third phase, and the induced voltage of the coil in the second phase when a current is supplied between the first phase and the third phase.

BRIEF DESCRIPTION OF THE DRAWINGS

FIGS. 6A and 6B illustrate a parameter table according to one embodiment of the present invention.

FIGS. 7A and 7B show the spin-up time comparison between a conventional hard disk drive and the hard disk drive according to an embodiment of the present invention.

FIGS. 8A and 8B show the error frequency comparison between a conventional hard disk drive and the hard disk drive according to an embodiment of the present invention.

DETAILED DESCRIPTION OF THE INVENTION

Embodiments of the present invention will now be described. However, the following description of the embodiments is to be considered in all respects only as illustrative and not restrictive. The present invention is not limited to the embodiments described below. For purposes of clarity and understanding, the following description and the accompanying drawings are abbreviated or simplified as appropriate. It will be apparent to those skilled in the art that various changes, additions, and modifications may be readily made to the elements of the following embodiments without departing from the spirit and scope of the present invention.

Figure 1:
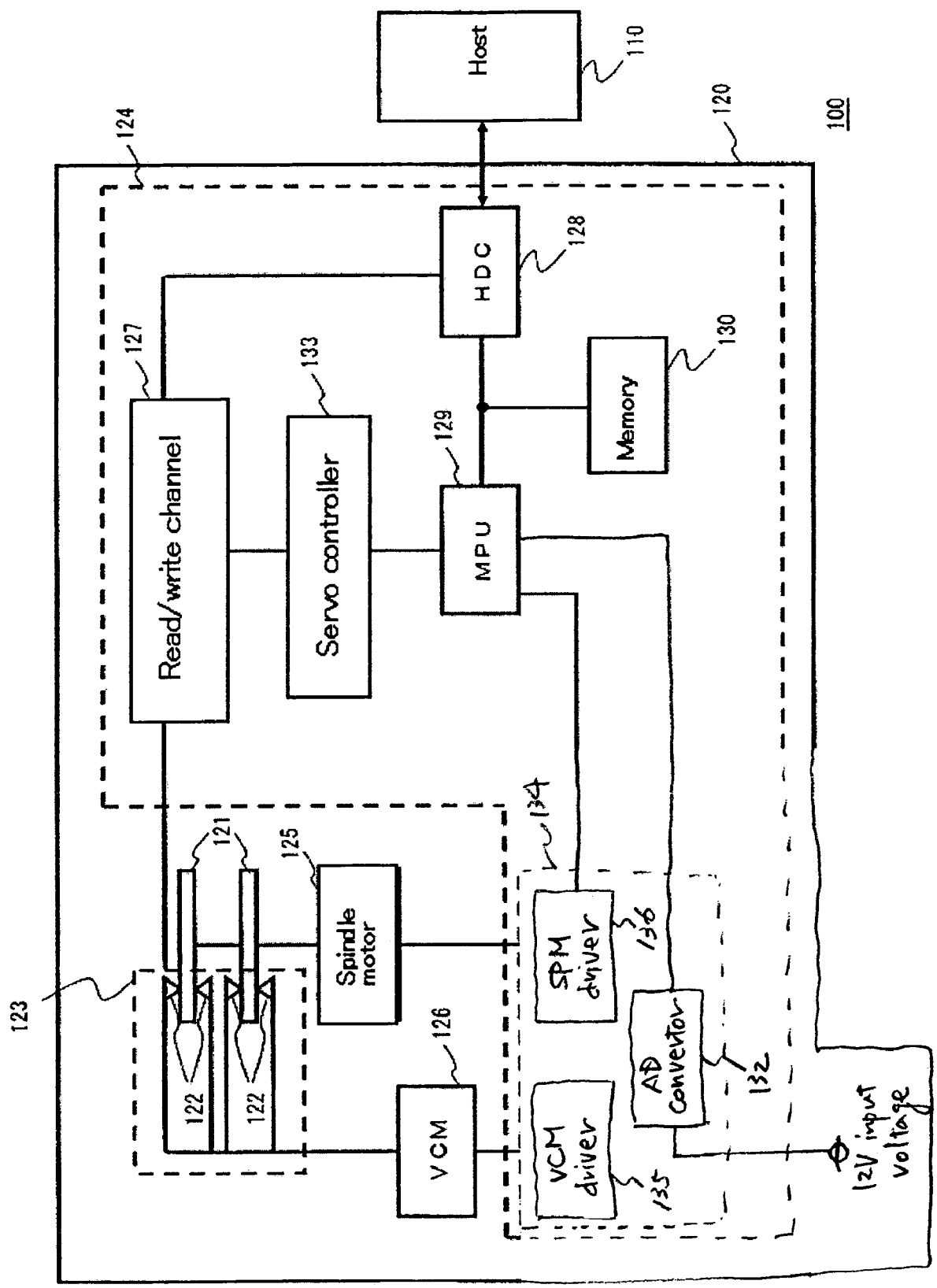
FIG. 1 is a block diagram that illustrates the logical configuration of a hard disk drive according to one embodiment of the present invention.

FIG. 1 schematically shows the configuration of a data processing system 100 according to one embodiment of the present invention. The data processing system 100 includes a computer, digital camera, or other host 110 for data processing and a hard disk drive 120, which is a data storage device for storing data transmitted from the host 110. The housing for the hard disk drive 120 contains a head stack assembly 123, which comprises one or more magnetic disks 121 and magnetic heads 122 for magnetic disk recording surfaces.

Each magnetic head 122 includes a recording element and a playback element. The recording element converts an electrical signal to a magnetic field in accordance with data stored on a magnetic disk 121. The playback element converts a magnetic field generated from a magnetic disk 121 to an electrical signal. Further, each magnetic head 122 has a slider. The recording element and playback element are formed on the surface of the slider. For explanation purposes, the head stack assembly 123 contains four magnetic heads 122. However, the head stack assembly 123 may contain one or any plurality of magnetic heads. The hard disk drive 120 includes a controller 124, which controls the above elements in order to write data onto the magnetic disks 121 or read data from the magnetic disks 121.

Host user data transmitted from the host 110 is processed as needed by the controller 124 for conversion to a write signal and then forwarded to the head stack assembly 123. In accordance with the acquired write signal, the magnetic head 122 writes data onto the recording surface of the magnetic disk 121. Meanwhile, a read signal, which is read from the magnetic disk by the magnetic head 122, is converted to a digital signal by the controller 124, processed as needed, and then transmitted to the host 110.

The magnetic disk 121 is a nonvolatile recording medium whose magnetic layer becomes magnetized to record data. While the hard disk drive 120 is operating, the magnetic disk is driven to rotate around the spindle shaft of a spindle motor 125 at a specified speed. While the hard disk drive 120 is not operating, the magnetic disk 121 is at a standstill. A plurality of tracks are concentrically formed on the surface of the magnetic disk 121 to serve as data storage blocks. Each track comprises a plurality of sectors that are arranged in circumferential direction.

A servo data storage area is formed on the surface of the magnetic disk 121. Typically, the magnetic disk 121 has a plurality of servo data storage areas that are formed radially. Each sector contains a servo data storage area and a user data storage area. When the magnetic head 122 reads servo data, the positional information about the magnetic head 122 is obtained. The servo data includes track data, which contains track number information, sector data, which contains sector number information, and a burst pattern.

The head stack assembly 123 is mounted within a frame so that it can swing over the surface of the magnetic disk 121. It is driven by a voice coil motor (VCM) 126. The magnetic head 122, which includes the slider and thin magnetic film element, is mounted at the end of the head stack assembly 123. When the head stack assembly 123 swings, the magnetic head 122 moves radially over the surface of the magnetic disk 121. In this manner, the magnetic head 122 is allowed to access a desired track.

In the example shown in FIG. 1, the head stack assembly 123 contains two magnetic heads 122 for each magnetic disk 121. These magnetic heads respectively relate to the front and back surfaces of the magnetic disk 121. While a magnetic head 122 is performing no data write/read process, it is parked on the ramp mechanism (not shown), which is positioned outside the magnetic disk 121. If the CSS (Contact Start and Stop) method is employed, however, the magnetic head 122 is parked in a CSS zone. The magnetic head 122 writes data onto the magnetic disk 121 or reads the servo data and user data from the magnetic disk 121.

As shown in FIG. 1, the controller 124 comprises a read/write channel 127, a hard disk controller (HDC) 128, a microprocessor unit (MPU) 129, a memory 130, an AD converter (ADC) 132 for detecting an input voltage value and converting it to a digital equivalent, a servo controller 133, and a motor driver unit 134. The motor driver unit 134 comprises a voice coil motor driver (VCM driver) 135 and a spindle motor driver (SPM driver) 136.

The read/write channel 127 performs a write process on data acquired from the host 110. In the write process, the read/write channel subjects the write data supplied from the hard disk controller 128 to code modulation, converts the resulting code-modulated write data to a write signal (current), and supplies the write signal to the magnetic head 122. The magnetic head 122 writes the data onto the magnetic disk 121 by invoking a current flow to a coil in accordance with the acquired signal. When data is to be supplied to the host 110, a read process is performed. In the read process, the read/write channel 127 extracts data from a read signal that is supplied from the magnetic head 122 and performs a decoding process. The resulting decoded read data is supplied to the hard disk controller 128.

The MPU 129 operates in accordance with a microcode loaded into the memory 130 for the purpose of exercising overall control of the hard disk drive 120, including positioning control of the magnetic head 122, interface control, and defect management, and performing necessary data processes. When the hard disk drive 120 starts up, the microcode running in the MPU 129 and the data required for control and data processing operations are loaded from the magnetic disk 121 or ROM (not shown) into the memory 130.

The digital data read by the read/write channel 127 includes the servo data in addition to the user data fed from the host 110. The servo controller 133 extracts the servo data from the read data acquired from the read/write channel 127. The servo data includes track data, sector data, and burst pattern. The extracted servo data is transferred from the servo controller 133 to the MPU 129. In accordance with the microcode, the MPU 129 uses the servo data to perform a positioning control process for the magnetic head 122. VCM control data, which is fed from the MPU 129, is set in a register of the motor driver unit 134. In accordance with the VCM control data that is set, the VCM driver 135 supplies a drive current to the VCM 126 to rotate the head stack assembly 123.

In accordance with the microcode, the MPU 129 sets SPM control data in the register of the motor driver unit 134 to provide rotation control of the spindle motor 125. The SPM driver 136 exercises rotation control of the spindle motor 125 in compliance with the SPM control data that is set. The SPM driver 136 not only supplies a drive current to the spindle motor 125 for the purpose of rotating the spindle motor 125, but also detects the rotor position to provide optimum rotation control. Rotor position detection is achieved when the spindle motor 125 starts up or is in steady-state rotation. Spindle motor control by the SPM driver 136 will be described later in detail.

The AD converter 132 detects an input voltage Vcc and converts an analog signal, which indicates an input voltage value, to digital data. The digital data, which indicates the input voltage value, is used by the MPU 129 for microcode-based processing. In the present embodiment, the input voltage value data is used for the control of the spindle motor 125, and especially for a rotor position detection process that is performed when the spindle motor 125 starts up. The use of the input voltage value data will be described in detail later.

The hard disk controller 128 has a function for interfacing with the host 110. It therefore receives user data, read command, write command, and other commands from the host 110. The received user data is transferred to the read/write channel 127. The data read from the magnetic disk, which is acquired from the read/write channel 127, is transmitted to the host 110. Further, the hard disk controller 128 performs a code generation process on the user data acquired from the host 110 for error correction (ECC) purposes. In addition, the hard disk controller 128 performs an error correction process on read data that is read from the magnetic disk 121.

Figure 2:
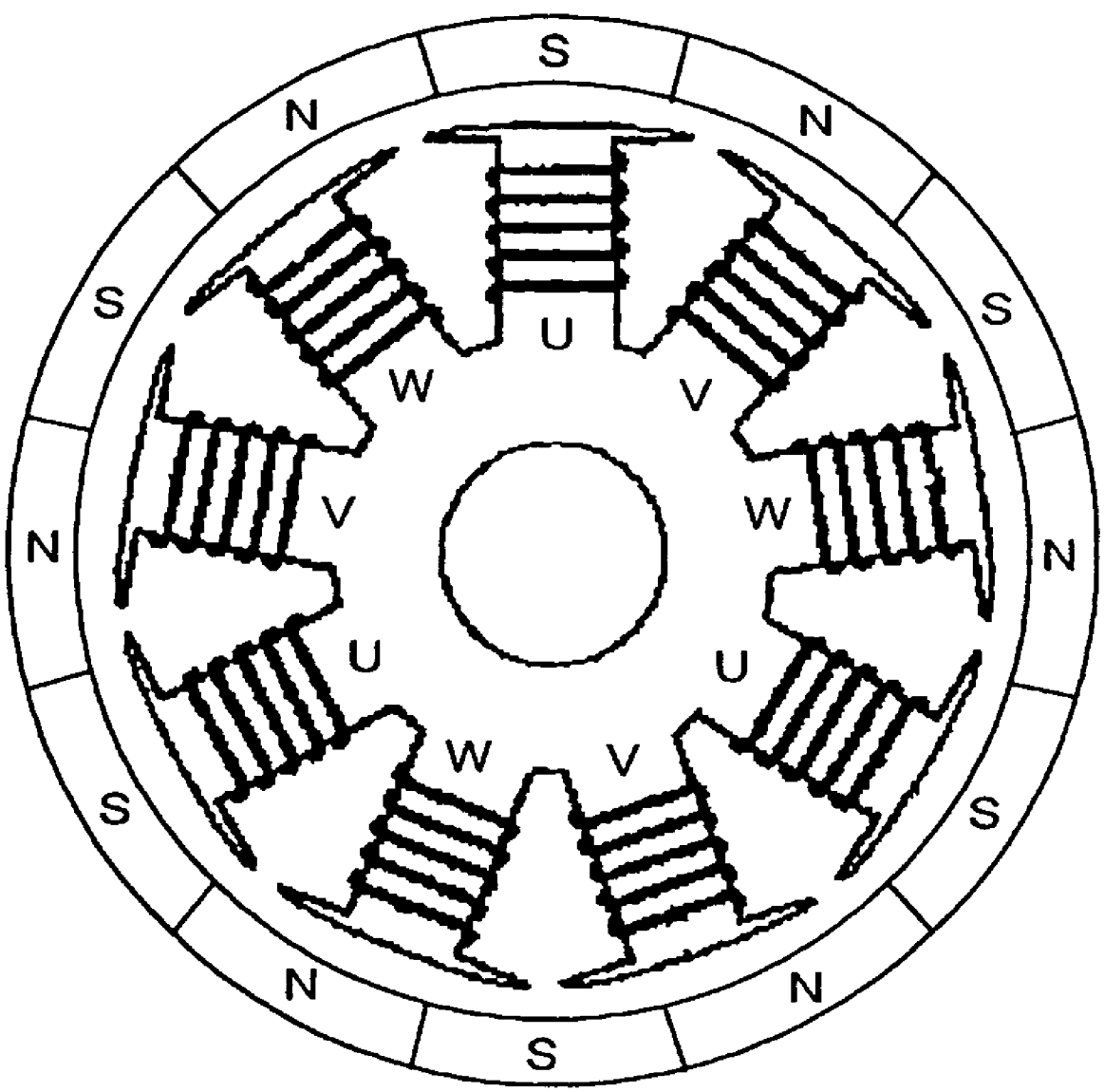
FIG. 2 schematically shows a 3-phase, 12-pole, 9-slot sensorless DC motor according to one embodiment of the present invention.

The control of the spindle motor 125, which is exercised by the hard disk drive 120 according to the present embodiment, will now be described. The present embodiment will be described on the assumption that a 3-phase sensorless DC motor is used as the spindle motor 125. FIG. 2 shows a 3-phase, 12-pole, 9-slot sensorless DC motor as a typical example. The 3-phase sensorless DC motor comprises 3-phase stator coils. The three phases are U, V, and W phases. When a current flows to the stator coils, the rotor having a 12-pole magnet rotates.

A current flows to the three-phase stator coils so that the spindle motor 125 is driven to rotate. The current flows between any two coil phases. For example, the current flows from the U phase to the V phase or from the V phase to the W phase. When the current sequentially flows in a specified direction from one coil phase to another, the spindle motor 125 is driven to rotate. For accurate rotor rotation, it is necessary that the rotor position be detected. The 3-phase sensorless DC motor does not have a hall element or the like for rotor position detection. Therefore, a voltage induced on a coil in a certain phase is detected to achieve rotor position detection. The process for rotor position detection is performed at the beginning of rotation and during steady-state rotation.

Figure 3:
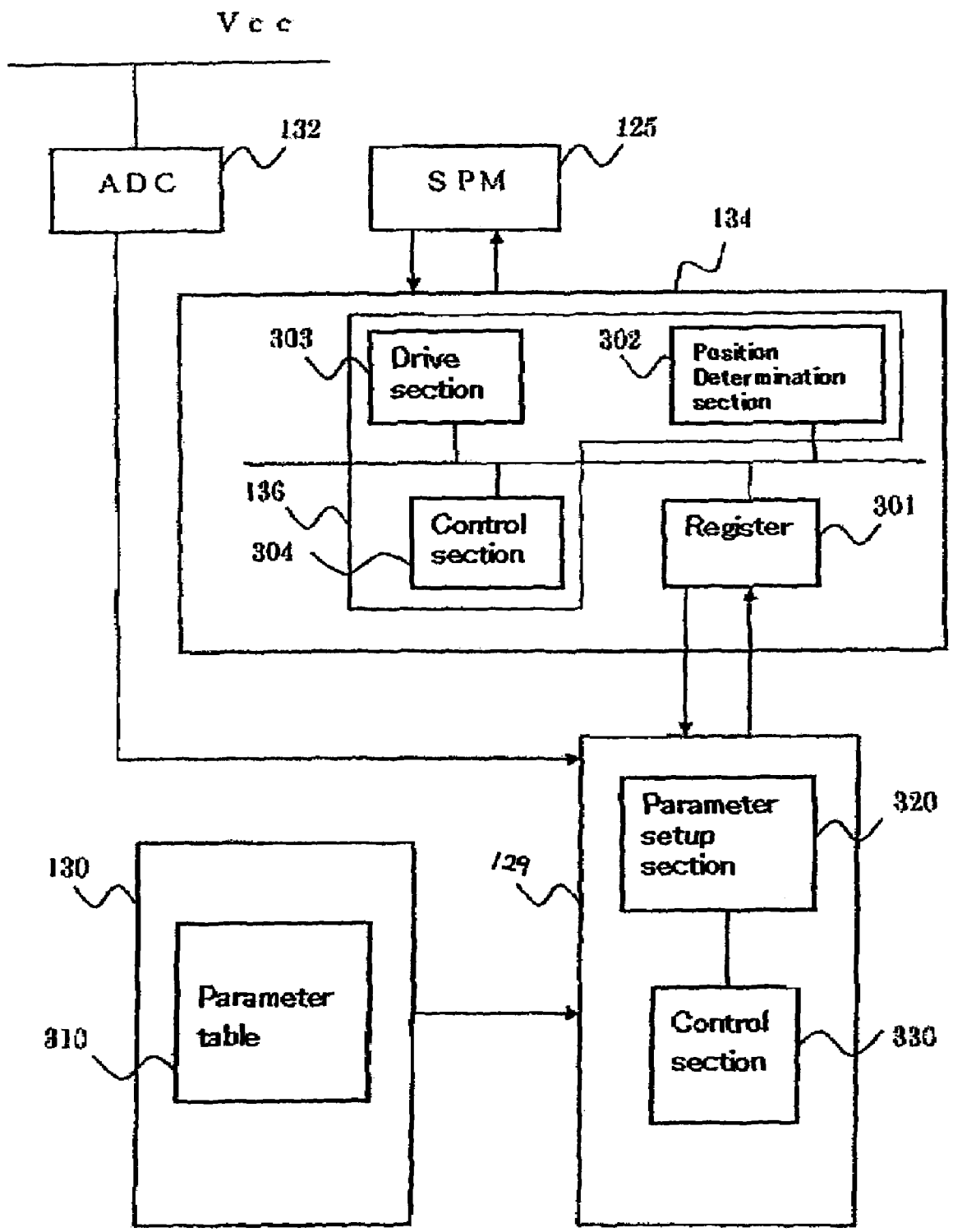
FIG. 3 is a block diagram that illustrates the logical configuration for controlling a spindle motor according to one embodiment of the present invention.

FIG. 3 is a block diagram illustrating a logical configuration that the present embodiment uses to control the spindle motor 125. The SPM driver 136 controls the spindle motor 125 in compliance with the instructions given by the microcode that is executed by the MPU 129. For controlling the spindle motor 125, either startup control or rotation control is exercised. Startup control is exercised to start up the spindle motor 125 that is at a standstill. Rotation control is exercised to control the spindle motor 125 after its startup. In these two control modes, the MPU 129 and SPM driver 136 cooperate as described above. The MPU 129 and SPM driver 136 function as a motor control section.

For example, the MPU 129 sets a target rotational speed data in the register 301 of the motor driver unit 134 for rotation control purposes. Meanwhile, the SPM driver 136 detects a rotational speed from a pulse output that the spindle motor 125 generates in accordance with the rotational speed. The SPM driver 136 references the target rotational speed data that is set in the register, compares it against the detected rotational speed, and controls the drive current output to the spindle motor 125 in such a manner that the rotational speed of the spindle motor 125 agrees with the target rotational speed.

The startup control of the spindle motor 125 will now be described in detail. The startup control is exercised so that the motor at a standstill enters a steady-state rotation state. In the startup control according to the present embodiment, the positional relationship between the rotor and stator in the spindle motor 125 is detected before the spindle motor 125 rotates or when it is in a free-running state. The phase (U, V, or W phase) for startup is determined according to the detected rotor position. When accurate position detection is achieved, the rotation of the spindle motor 125 can be started accurately.

If position detection is not accurately achieved, reverse rotor rotation or other improper rotation may result. If rotor rotation does not accurately start, a retry process is performed so as to exercise startup control from the beginning. Therefore, the spin-up time of the spindle motor 125 extends or varies. As described earlier, the spin-up time is a time interval between the instant at which the startup process begins and the instant at which the spindle motor begins its steady-state rotation. The hard disk drive 120 according to the present embodiment achieves rotor position detection or determination with increased accuracy by changing a startup control parameter, particularly a position detection parameter, in accordance with the value of the input voltage, which is a supply voltage for position detection.

Referring to FIG. 3, the motor driver unit 134 includes the SPM driver 136 and the register 301, which stores control data fed from the MPU 129. The SPM driver 136 includes a position determination section 302, a drive section 303, and a control section 304. The reference numeral 310 denotes a parameter table, which is used to register startup control parameters for the spindle motor 125. The parameter table 310 can be stored in the memory 130. When, for instance, the hard disk drive 120 turns OFF, the parameter table 310 is stored in a predefined storage area on the magnetic disk. When the hard disk drive 120 turns ON, the memory 130 can store the parameter table 310. The reference numeral 320 denotes a parameter setup section, which performs parameter setup for startup control. The reference numeral 330 denotes a control section that provides startup process control. When the MPU 129 executes a specified microcode during startup control, the MPU 129 performs the functions of the parameter setup section 320 and control section 330.

The position determination section 302 can determine the rotor position of the spindle motor 125 in accordance with a coil's induced voltage. The drive section 303 exercises rotor rotation control by controlling the drive current to be supplied to the spindle motor 125. The control section 304 performs a process for controlling various functional blocks within the SPM driver 136. The parameter setup section 320 references the parameter table 310 and sets a startup control parameter in the register 301.

Figure 4:
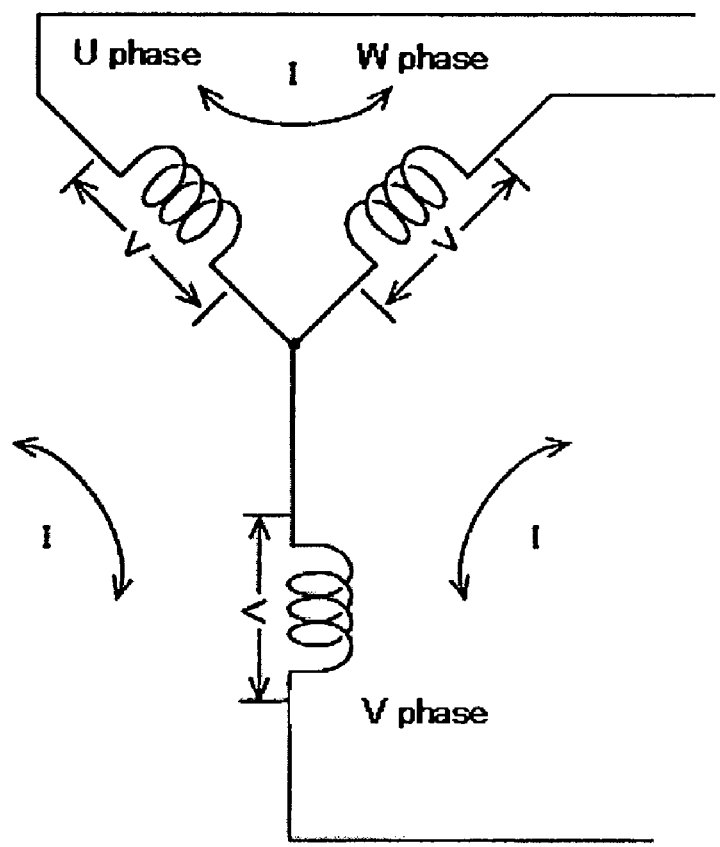
FIGS. 4A and 4B illustrate a rotor position detection method according to one embodiment of the present invention.
Figure 4:
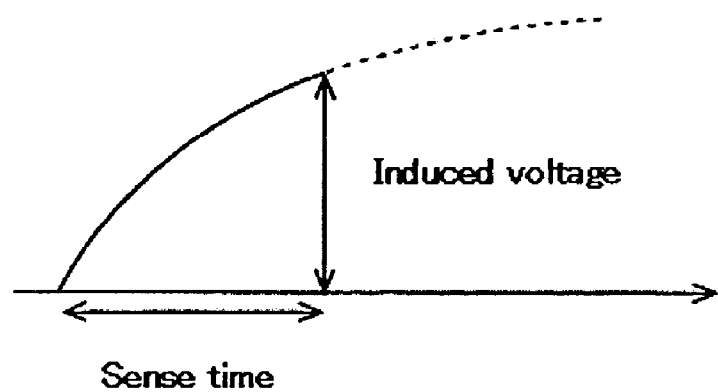

There are some known methods for detecting the rotor position during startup control. In the present embodiment, however, a current for position detection flows between two out of three phase stator coils, and the voltage induced on the stator coil in the remaining phase is detected to detect and determine the rotor position. FIGS. 4A and 4B schematically show the stator coil circuit configuration for the purpose of illustrating the position detection principle according to the present embodiment. As shown in FIG. 4A, the stator coil assembly comprises stator coils having three phases (U phase, V phase, and W phase). The three phase stator coils are joined by a central tap. The other ends of the U, V, and W phase stator coils are connected to the SPM driver 136.

For rotor position detection purposes, the position detection current I flows as described above between two phase coils, which are selected out of the three phase stator coils, and the voltage induced on the remaining coil is detected. The position detection current is a very small current and cannot start rotor rotation. Further, the process for detecting the position detection current and induced voltage is repeated after changing the stator coil that is targeted for detecting the induced voltage V. The induced voltage detection process, which is performed on two different current directions, is executed for each of the three phase stator coils.

The description will now be given in detail. The rotor position detection process is performed by the position determination section 302 of the SPM driver 136. The position determination section 302 supplies the position detection current, for instance, from the U-phase stator coil to the V-phase stator coil (from the U-phase terminal to the V-phase terminal). The position determination section 302 detects an induced voltage that the position detection current induces on the W-phase stator coil. Subsequently, the position detection current is supplied from the V-phase stator coil to the U-phase stator coil, and the voltage induced on the W-phase stator coil is detected. Next, the position detection current is supplied from the V-phase stator coil to the W-phase stator coil, and the voltage induced on the U-phase stator coil is detected. Then, the position detection current is supplied from the W-phase stator coil to the V-phase stator coil, and the voltage induced on the U-phase stator coil is detected.

Next, the position detection current is supplied from the W-phase stator coil to the U-phase stator coil, and the voltage induced on the V-phase stator coil is detected. Finally, the position detection current is supplied from the U-phase stator coil to the W-phase stator coil, and the voltage induced on the V-phase stator coil is detected.

Although the method described thus far detects the induced voltage of each stator coil in two different current directions, an alternative is to perform a single detection operation for each stator coil. It should also be noted that the induced voltages may be detected in a sequence other than that described above.

The position determination section 302 stores a predefined induced voltage threshold value. It compares the detected induced voltage against the threshold value to determine whether the induced voltage phase of each stator coil is plus (+) or minus (−). Further, the position determination section 302 has a table (not shown) that defines the relationship between the induced voltage phase combination of each stator coil and the phase for startup. The position determination section 302 references the table to determine the stator coil phase for startup current supply in accordance with the induced voltage phase combination of each stator coil. If, for instance, a typical full-wave drive method is employed for the spindle motor of the hard disk drive, the position determination section 302 determines that the drive current should be first supplied from which stator coil phase to which stator coil phase.

In startup control according to the present embodiment, the rotor position detection parameter for the startup of the spindle motor 125 is set in accordance with the value of the input voltage, which is the supply voltage for the position detection current. The parameter table 310 contains registered position detection parameter values appropriate for input voltage values. The value of the position detection current supplied to the spindle motor 125 for position detection purposes varies with the value of the input voltage. Further, the voltage induced on a stator coil varies with the value of the position detection current. If, for instance, the position detection current decreases, the induced voltage decreases because the resistance value of the spindle motor 125 is fixed.

When the induced voltage decreases, the position determination section 302 may fail to accurately detect the induced voltage in a position detection process based on the same parameter value. Meanwhile, the induced voltage increases with an increase in the input voltage. The increase in the startup voltage does not have a substantially adverse effect on induced voltage detection. However, if the same parameter value is used, the input current for the position detection process increases with an increase in the input voltage. Since the increase in the input current imposes an increased load on the power supply, it is demanded that the input current increase be minimized. It should also be noted that the input current decreases with a decrease in the input voltage.

In the present embodiment, the parameter value is changed in accordance with a change in the input voltage, which is an example of a supply voltage for position detection. This ensures that the induced voltage to be detected can be accurately detected. As an alternative to direct detection of the input voltage, the supply voltage that is varied from the input voltage by another circuit such as a voltage booster circuit may be detected. Sense time is one favorable position detection parameter that is to be varied with the input voltage value. The sense time corresponds to the monitoring time for the induced voltage that the position detection current induces on a stator coil. As indicated in FIG. 4B, the induced voltage increases with an increase in the elapsed time from the start of position detection current supply. When the sense time is increased with a decrease in the input voltage, the induced voltage can be detected with increased accuracy. Meanwhile, the input current increases with an increase in the sense time. As described earlier, the increase in the input current increases the load on the power supply. Therefore, an unnecessary increase in the sense time should be avoided.

Further, when the input voltage increases, the induced voltage also increases. Therefore, even when the sense time setting is decreased, the voltage induced on a stator coil can be accurately detected. Meanwhile, the input current for position detection can be decreased when the sense time is decreased. Consequently, when the sense time is decreased with an increase in the input voltage, it is possible to achieve accurate rotor position detection while reducing the load on the power supply. As such being the case, the induced voltage can be accurately detected when an appropriate sense time setting is selected according to the input voltage value. Further, the load on the power supply can be reduced by decreasing the input current for use in position detection during the startup process. In the present embodiment, the sense time varies with the input voltage. However, a single sense time setting is used for induced voltage detection of each phase.

Figure 5:
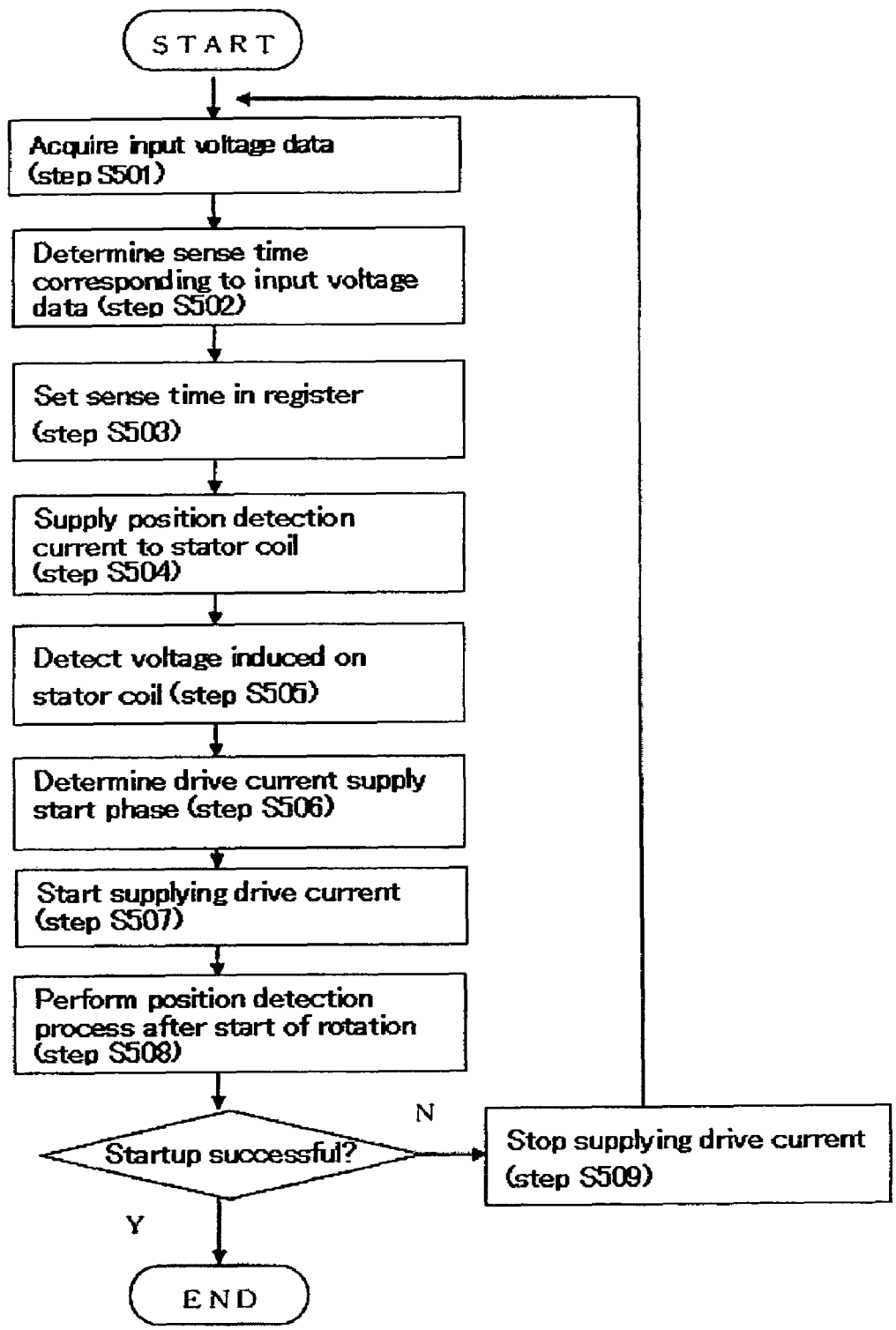
FIG. 5 is a flowchart that illustrates a spindle motor startup process according to one embodiment of the present invention.

The operations performed by various logical blocks during the startup process will now be described with reference to the block diagram in FIG. 3 and a flowchart in FIG. 5. When the startup process begins, the control section 330, which is operated by the MPU 129, acquires input voltage data, which indicates the value of the input voltage, from the AD converter 132 (step S501). The control section 330 passes the acquired input voltage data to the parameter setup section 320 to issue instructions on a parameter determination process. The parameter setup section 320 references the parameter table 310 that is stored in the memory 130, and determines a parameter value appropriate for the acquired input voltage data. In the present embodiment, the relationship between the sense time and input voltage data is registered in the parameter table 310. Therefore, the parameter setup section 320 determines the sense time that is appropriate for the acquired input voltage data (step S502).

The parameter setup section 320 sets the determined parameter value in the register 301 of the motor driver unit 134 (step S503). In response to sense time setup in the register, the control section 304 of the SPM driver 136 instructs the position determination section 302 to perform a rotor position detection process. The position determination section 302 acquires sense time from the register 301. The position determination section 302 supplies the position detection current to each stator coil phase in a specified sequence described above (step S504). Further, the position determination section 302 detects the voltage induced on each stator coil during the sense time acquired from the register 301 (step S505).

As described earlier, the position determination section 302 has already acquired a table that defines the relationship between the combinations of induced voltage phases and the stator coil to which the drive current should be supplied first. The position determination section 302 references the table to determine the drive current supply start phase that corresponds to the combination of acquired induced voltage phases (step S506). The control section 304 acquires from the position determination section 302 the information about the stator coil to which the drive current is to be supplied first, and instructs the drive section 303 to supply the drive current. In compliance with the instruction from the control section 304, the drive section 303 begins to supply the drive current from a specified stator coil phase to a specified stator coil phase (step S507).

Even after the spindle motor 125 starts rotating, the position determination section 302 performs a rotor position detection process (step S508). Position detection can be accomplished, for instance, by detecting the back electromotive force that is induced on a stator coil. When the spindle motor 125 is accurately rotating, the position determination section 302 notifies the control section 304 that the spindle motor 125 is successfully started. In response to the notification from the position determination section 302, the control section 304 sets PASS data in the register 301 to indicate that the startup process has been successfully performed. The control section 330 of the MPU 129 acquires the PASS data from the register 301 and determines that the startup process is completed.

If the spindle motor 125 is not accurately rotating in a specified direction, the position determination section 302 notifies the control section 304 that the spindle motor 125 has not been successfully started. In response to the notification from the position determination section 302, the control section 304 instructs the drive section 303 to stop supplying the drive current. In compliance with the instruction from the control section 304, the drive section 303 stops supplying the drive current to the spindle motor 125 (step S509). Further, the control section 304 sets FAIL data in the register 301 to indicate that the startup process has been unsuccessful.

Upon receipt of the FAIL data from the register 301, the control section 330 operating within the MPU 129 determines that rotation control has not been successfully exercised over the spindle motor 125, and that a retry process should be performed. The control section 330 acquires the data indicating the input voltage value again from the AD converter 132, and instructs the parameter setup section 320 to perform a parameter setup process. In the sequence described above, the parameter setup section 320 performs the parameter setup process. Subsequently, the motor driver unit 134 and MPU 129 perform the same process as indicated above to execute the retry process. The retry process ends when the spindle motor 125 begins to rotate accurately.

FIGS. 6A and 6B show preferred examples of the parameter table 310 in which the sense time is registered. FIG. 6A shows the configuration of the parameter table 310. FIG. 6B shows a typical relationship between input voltage values and input current values in the startup process. As indicated in FIG. 6A, the parameter table 310 classifies input voltage values into three categories. In the parameter table 310, three different sense time values are also registered for the three voltage categories. As indicated in FIG. 6A, an identifier for determining the length of sense time is registered.

FIG. 6B indicates a case where the reference input voltage is 12 V and the reference input current is 2 A. The parameter table 310 shows three voltage categories (categories A, B, and C). Category A represents a voltage of 11.04 V or higher but lower than 11.4 V. Category B represents a voltage of 11.4 V or higher but lower than 12.6 V. Category C represents a voltage of 12.6 V or higher but lower than 13.2 V. For the input voltage, the present embodiment allows a margin of plus 10%, minus 8%. For category A, the sense time value "9" is registered. For category B, the sense time value "8" is registered. For category C, the sense time value "7" is registered. The sense time values do not represent actual time but serve as an index that indicates the relative length of sense time. The greater the sense time value, the longer the sense time. Typically, the actual length of sense time varies in increments of 10% to 20% with reference to approximately 10 ms whenever the sense time value changes by one.

As shown in FIG. 6B, the input current for position detection increases with an increase in the input voltage and increases with an increase in the sense time. The present embodiment defines the relationship between the sense time and input voltage so that the input current is not larger than a reference current of 2 A. For example, the input current for category A is 1.87 or larger but smaller than 1.98. For category B, the input current is 1.78 or larger but smaller than 2.07 (set to be not larger than 2 A). For category C, the input current is 1.87 or larger but smaller than 1.98. When the sense time is maximized while the increase in the input current is minimized, the accuracy of position detection increases with the load on the power supply minimized.

FIGS. 7A, 7B, 8A, and 8B show the spin-up time/error frequency comparison between a conventional hard disk drive and the hard disk drive according to the present embodiment. The hard disk drive according to the present embodiment varies the sense time in accordance with the input voltage. However, the conventional hard disk drive keeps the constant sense time without regard to the input voltage value. FIG. 7A shows the spin-up time of the conventional hard disk drive, whereas FIG. 7B shows the spin-up time of the hard disk drive according to the present embodiment. FIG. 8A shows the error frequency of the conventional hard disk drive, whereas FIG. 8B shows the error frequency of the hard disk drive according to the present embodiment.

The data presented in FIGS. 7A and 7B were obtained when the spin-up times of the conventional hard disk drive and the hard disk drive according to the present invention were detected 100 times at each combination of temperature and input voltage. Each numerical value indicates the spin-up time (in seconds). From the top row to the bottom, the indicated values denote the average value, maximum value, minimum value, and standard deviation value. Detection was achieved at a combination of middle temperature and middle input voltage, at a combination of high temperature and low input voltage, at a combination of high temperature and high input voltage, at a combination of low temperature and low input voltage, and at a combination of low temperature and high input voltage. When the standard deviations indicated in FIGS. 7A and 7B are referenced, it can be understood that the spin-up time variations of the hard disk drive according to the present embodiment are greatly improved over those of the conventional hard disk drive. Consequently, when an appropriate sense time setting is employed in accordance with the input voltage, the spin-up time can be properly controlled no matter whether the input voltage varies.

The data presented in FIGS. 8A and 8B were obtained when the retry counts of the conventional hard disk drive and the hard disk drive according to the present embodiment were detected 1000 times at each combination of temperature and input voltage. The temperature and input voltage conditions were the same as those indicated in FIGS. 7A and 7B. The numerical values indicate the retry count distribution in percent. As is obvious from FIGS. 8A and 8B, the retry counts of the hard disk drive according to the present embodiment are much lower that those of the conventional hard disk drive. As regards the hard disk drive according to the present embodiment, only one retry was detected at a combination of high temperature and low input voltage. Consequently, when an appropriate sense time setting is employed in accordance with the input voltage, the retry count can be greatly decreased no matter whether the input voltage varies.

In the above example, the sense time, which means the induced voltage detection time, is used as a preferred position detection parameter that is to vary with the input voltage. An alternative preferred parameter is drive time. The drive time means the time during which the position detection current is supplied to the spindle motor 125 within the startup process. When the drive time increases, the position detection accuracy increases. However, an increase in the drive time causes an increase in the input current. It is therefore important that an appropriate drive time setting be employed in accordance with the input voltage value. As is the case with the sense time, the drive time is set so that it increases with a decrease in the input voltage and decreases with an increase in the input voltage. This results in improving the accuracy of position detection or minimizing the load on the power supply.

As an alternative to or in addition to determining the sense time in accordance with the input voltage by referencing the parameter table as described above, it is possible to determine the sense time with a predefined arithmetic expression. The use of an arithmetic expression makes it possible to set the sense time in more detail. As regards the arithmetic expression, the use of the parameter table, the data count (category count) in the parameter table, and the like, an appropriate conformation is selected from the viewpoint of ease of design, consistency with measured data, or the like.

The position detection method according to the above embodiment of the present invention is suitable for spindle motor position detection. However, it can also be applied to the position detection of a VCM or other type of motor. The present invention can be applied to a data storage device for data playback only or data recording only in addition to a data storage device for data recording and playback. For use in such an application, the magnetic head comprises a playback element only or a recording element only. The present invention is applicable not only to magnetic storage devices but also to various other types of data storage devices such as optical or magneto-optical storage devices. Further, the present invention is also applicable to various devices for performing a motor startup process as well as to data storage devices.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device, comprising:
   a storage disk configured to store data;
   a motor configured to rotate said storage disk;
   a memory configured to store a parameter table containing registered position detection parameter values corresponding to possible supply voltage values; and
   a motor control section configured to control said motor;
   wherein said motor control section includes:
      a parameter setup section configured to reference said parameter table, to determine which of said registered position detection parameter values correspond to an acquired supply voltage value of a supply voltage, and to set said determined parameter value in a register, said determined parameter value being used for detecting the position of said motor and for providing drive current parameters for driving said motor;

an induced voltage detection section configured to detect a voltage induced on a coil of said motor in accordance with said determined parameter value set by said parameter setup section; and a rotor position determination section configured to determine the rotor position of said motor in accordance with said induced voltage detected by said induced voltage detection section.

2. The data storage device according to claim 1, wherein said parameter setup section sets a detection time parameter for determining the detection time for said induced voltage in accordance with said supply voltage value, and wherein said induced voltage detection section detects said induced voltage during the detection time corresponding to the detection time parameter set by said parameter setup section.

3. The data storage device according to claim 2, wherein said parameter setup section sets a detection time parameter that increases with a decrease in said supply voltage.

4. The data storage device according to claim 3, wherein said parameter setup section determines a temperature category to which said supply voltage belongs, and sets a detection time parameter corresponding to said determined temperature category.

5. The data storage device according to claim 1,
wherein said motor includes coils in multiple phases, and
wherein said induced voltage detection section supplies a current for rotor position determination to a coil in a specified phase and detects the induced voltage of a coil to which said current is not supplied.

6. The data storage device according to claim 5, wherein said induced voltage detection section supplies a current on a level on which rotor rotation does not occur to said motor as a current for determining said rotor position.

7. The data storage device according to claim 5,
wherein said parameter setup section sets a current supply time parameter for determining the supply time for said current in accordance with said supply voltage value, and wherein said induced voltage detection section supplies said current to a coil in said specified phase during the supply time corresponding to the current supply time parameter set by said parameter setup section.

8. The data storage device according to claim 1,
wherein said motor includes coils in multiple phases,
wherein said induced, voltage detection section supplies a current for rotor position determination to a coil in a specified phase and detects the induced voltage of a coil to which said current is not supplied, wherein said parameter setup section sets a detection time parameter for determining the detection time for said induced voltage in accordance with said supply voltage value, and wherein said induced voltage detection section detects said induced voltage during the detection time corresponding to the detection time parameter set by said parameter setup section.

9. The data storage device according to claim 8, wherein said induced voltage detection section supplies a current on a level on which rotor rotation does not occur to said motor as a current for determining said rotor position.

10. The data storage device according to claim 9, wherein said induced voltage detection section supplies a current for determining said rotor position to said motor while the motor is stopped.

11. The data storage device according to claim 8, wherein said parameter setup section sets the value of said detection time parameter so that the value of a supply current for a process performed by said induced voltage detection section is not greater than a predefined value.

12. The data storage device according to claim 1, wherein said parameter setup section sets said parameter value so that the value of a supply current for a process performed by said induced voltage detection section is not greater than a predefined value.

13. The data storage device according to claim 1,
wherein said motor control section includes a parameter table for registering the relationship between supply voltage values and parameter values, and wherein said parameter setup section references said parameter table to set a particular one of said parameter values in accordance with a particular one of said supply voltage values.

14. A motor control method, comprising:
detecting a supply voltage for driving a motor;
referencing a parameter table containing registered position detection parameter values corresponding to possible supply voltage values;
determining which of said registered position detection parameter values correspond to said detected supply voltage;
setting a parameter value in accordance with said determined parameter value, said determined parameter value being used for detecting the position of said motor and for providing drive current parameters for driving said motor;
detecting, in accordance with said set parameter value, a voltage induced on a coil of said motor generated by a current supplied to said motor; and
determining a rotor position of said motor in accordance with said detected induced voltage.

15. The motor control method according to claim 14,
wherein said motor includes coils in multiple phases, and
wherein said induced voltage detecting supplies a current for rotor position determination to a coil in a specified phase and detects the induced voltage of a coil to which said current is not supplied.

16. The motor control method according to claim 15,
wherein said parameter value setting sets a detection time parameter for determining the detection time for said induced voltage in accordance with said supply voltage value, and wherein said induced voltage detecting detects said induced voltage during the detection time corresponding to said detection time parameter that is set.

17. The motor control method according to claim 15,
wherein said parameter value setting sets a current supply time parameter for determining the supply time for said current in accordance with said supply voltage value, and wherein said induced voltage detecting supplies said current to a coil in said specified phase during the supply time corresponding to the current supply time parameter set by said parameter setup section.

18. A motor control device for a motor having coils in multiple phases, comprising:
a parameter setup section configured to reference a parameter table containing registered position detection parameter values corresponding to possible supply voltage values, to determine which of said registered position detection parameter values correspond to an acquired supply voltage value, and to set said determined parameter value in a register, said determined parameter value being used for detecting the position of said motor and for providing drive current parameters for driving said motor;

an induced voltage detection section configured to supply a current to a specified coil in accordance with said determined parameter value set by said parameter setup section and to detect a voltage induced on a coil to which no current is supplied; and a rotor position determination section configured to determine the rotor position of said motor in accordance with said induced voltage detected by said induced voltage detection section.

19. The motor control device according to claim 18, wherein said motor includes a coil in a first phase, a coil in a second phase, and a coil in a third phase, and wherein said induced voltage detection section detects, in accordance with the same parameter value set by said parameter setup section, the induced voltage of the coil in said third phase when a current is supplied between said first phase and said second phase, the induced voltage of the coil in said first phase when a current is supplied between said second phase and said third phase, and the induced voltage of the coil in said second phase when a current is supplied between said first phase and said third phase.

20. The data storage device according to claim 1, wherein the one or more parameter values are calculated based on the supply voltage value.

21. The data storage device according to claim 1, wherein the one or more parameter values are obtained from a table.

* * * * *